US006094639A

United States Patent [19]

Kubota

[11] Patent Number: 6,094,639

[45] Date of Patent: Jul. 25, 2000

[54] HISTORY INFORMATION RECORDING APPARATUS AND PRODUCT EQUIPMENT PROVIDED WITH THE SAME

[75] Inventor: Michitaka Kubota, Kanagawa, Japan

[73] Assignee: Sony Corporation, Tokyo, Japan

[21] Appl. No.: 09/132,546

[22] Filed: Aug. 11, 1998

[30] Foreign Application Priority Data

Aug. 11, 1997 [JP] Japan ........................ 9-216296

[51] Int. Cl.[7] ........................ G06F 17/00

[52] U.S. Cl. ........................ 705/1

[58] Field of Search ........................ 705/1

[56] References Cited

U.S. PATENT DOCUMENTS

| | | | |
|---|---|---|---|
| 5,917,408 | 5/1999 | Cardillo et al. | 340/439 |
| 5,925,998 | 7/1999 | Olson | 318/484 |
| 5,983,369 | 11/1999 | Bakoglu et al. | 714/46 |

OTHER PUBLICATIONS

Titus, "Code labels track and identify products," Test and Measurement World, vol. 16, No. 4, p. 57–58, 60, 62, Mar. 1996.

*Primary Examiner*—Emanuel Todd Voeltz

*Assistant Examiner*—Phillip Groutt

*Attorney, Agent, or Firm*—Hill & Simpson

[57] ABSTRACT

A history information recording apparatus for recording history information about product equipment integrally therewith and the product equipment having this history information recording apparatus are provided. The history information recording apparatus comprises a first storage means for storing primary history information, a second storage means for storing secondary history information, an input module in which the primary history information and/or the second history information is inputted to be stored in the first storage means and/or the second storage means respectively, and a read module for reading the primary history information from the first storage means and the secondary history information from the second storage means. The first and second storage means, the input module, and the read module are arranged in the product information.

25 Claims, 11 Drawing Sheets

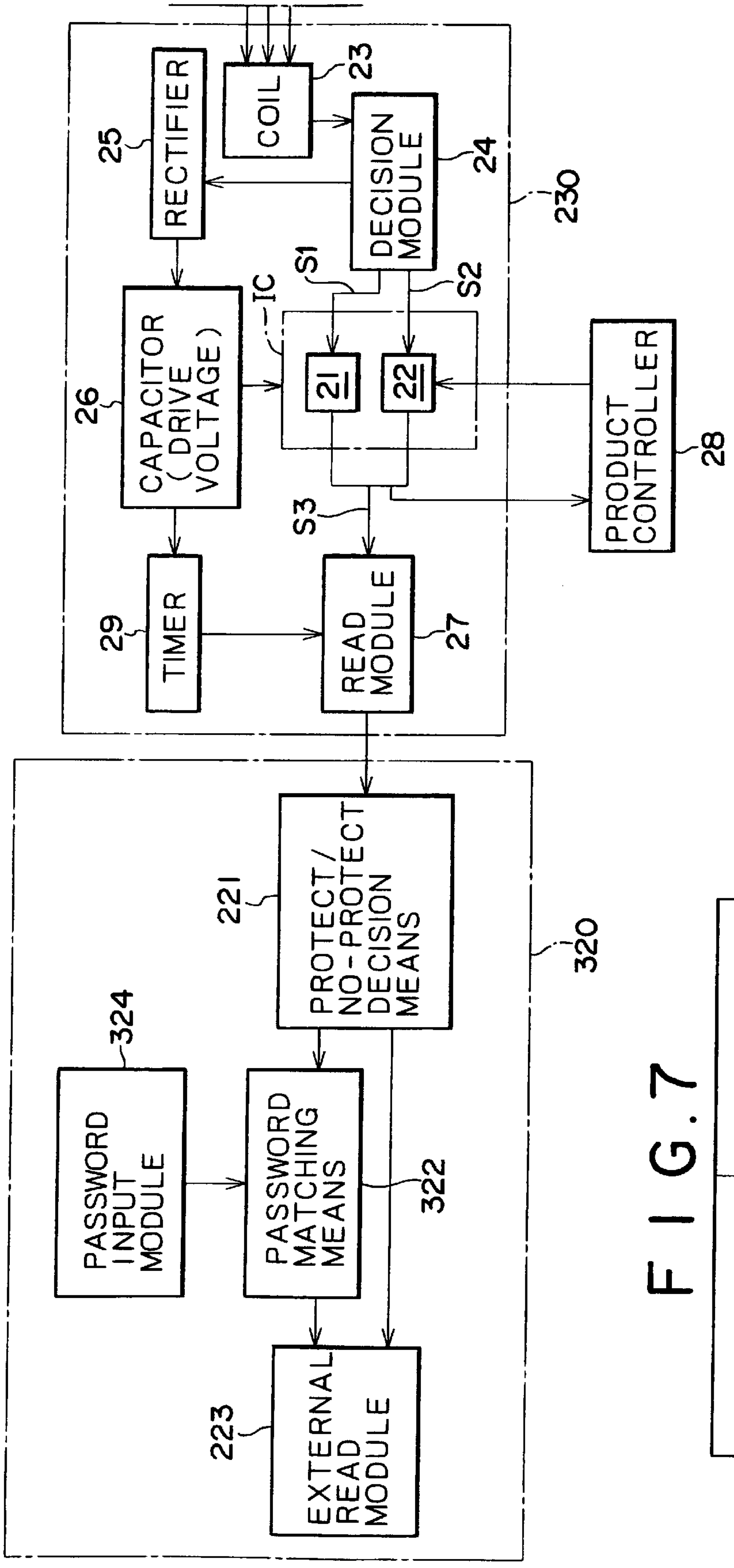
F I G. 7A
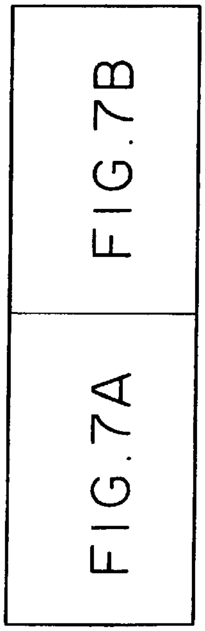
F I G. 7

HISTORY INFORMATION RECORDING APPARATUS AND PRODUCT EQUIPMENT PROVIDED WITH THE SAME

BACKGROUND OF THE INVENTION

1. Field of the Invention

The present invention generally relates to a history information recording apparatus associated with product equipment and to product equipment provided with this history information recording apparatus.

2. Description of Related Art

Generally, product equipment such as audio visual equipment (hereafter referred to as AV equipment) is furnished with a warranty card. This warranty card generally provided in a sheet of paper, describing product-associated information such as model number and serial number and sale-associated information such as sales office and date of sale. Based on the description of the warranty, the product is generally warranted for free-of-charge repair service within its warranty coverage of one year beginning with the date of sale for example.

From the viewpoint of users, this warranty card must be stored separately from the product. However, this sometimes present a problem of losing the warranty card. In addition, since the warranty card is made of paper, its surface may be contaminated with fungi or otherwise depending on the storage condition, making the terms of warranty and other printed information smudgy and illegible.

Although the product-associated information is printed on the warranty card before the shipment of the product from factory, the sale-associated information is provided at the sale of the product. To be more specific, a rubber stamp bearing the name of the store and the date of sale is impressed on the warranty card. However, this sometimes presents a problem that, if the date of sale for example is not impressed by the store intentionally for some reasons, the manufacturer has no means for identifying the date of sale. This poses a risk for the manufacturer to sustain damage from servicing a product with its warranty coverage expired. Moreover, if the date of sale is not identified, statistical product control after sale on such as product life and mean time between failures cannot be performed correctly.

Further, if each product has history information such as distribution history including arrival and shipment dates and names of wholesalers along distribution channels and repair service history including date, particulars, and personnel of servicing, in addition to the above-mentioned production information and sale information described on the warranty card, these pieces of information are useful in the production control after sale. However, ordinarily, these pieces of information have not all been recorded on each product.

SUMMARY OF THE INVENTION

It is therefore an object of the present invention to provide a history information recording apparatus for recording history information associated with product equipment integrally with the same and provide product equipment having this history information recording apparatus.

In carrying out the invention and according to a first aspect thereof, there is provided a history information recording apparatus comprising: a first storage means for storing primary history information; a second storage means for storing secondary history information; an input module in which the primary history information and/or the second history information is inputted to be stored in the first storage means and/or the second storage means respectively; and a read module for reading the primary history information from the first storage means and the secondary history information from the second storage means. The first storage means, the second storage means, the input module, and the read module are arranged on product equipment.

Preferably, the primary history information to be stored in the first storage means is associated with the product equipment and the secondary history information to be stored in the second storage means is associated with sale and/or service of the product equipment.

Preferably, the history information recording apparatus according to the invention inputs the primary history information and/or the secondary history information from outside into the input module in a non-contact manner.

In carrying out the invention and according to a second aspect thereof, there is provided product equipment having a history information recording apparatus comprising: a first storage means for storing primary history information; a second storage means for storing secondary history information; an input module in which the primary history information and/or the second history information is inputted to be stored in the first storage means and/or the second storage means respectively; and a read module for reading the primary history information from the first storage means and the secondary history information from the second storage means.

Preferably, the product equipment has a controller for controlling an operation of the product equipment. This controller prevents the product equipment from operating if the secondary history information does not come from the second storage means of the history information recording apparatus.

Preferably, the product equipment has a controller for controlling an operation of the product equipment. This controller writes to the second storage means information about a date on which the product equipment has started operating for the first time after shipment from factory.

According to the above-mentioned first and second aspects of the invention, the history information recording apparatus recorded with the primary and secondary history information is arranged on the product equipment. This integration of the product equipment and the history information thereabout prevents the history information from being lost and becoming smudgy and illegible depending on storage condition.

If the primary history information to be stored in the first storage means is associated with the product equipment and the secondary history information to be stored in the second storage means is associated with sale and/or service of the product equipment, the history information recording apparatus functions as an electronic warranty card and, at the same time, statistical control over the duration and the mean time between failures of the product equipment can be performed based on the history information associated with service.

If the primary history information and/or the secondary history information is inputted from outside into the input module in a non-contact manner, or based on an electromagnetic wave signal, an electrical signal, a voice signal, or an image signal for example, the secondary history information can be written from outside after the product equipment has been assembled or packaged.

If the product equipment has a controller for controlling an operation of the product equipment and this controller prevents the product equipment from operating when the secondary information does not come from the second storage means of the history information recording apparatus, illegal sale of this product equipment such as intentional omission of inputting the date of sale can be effectively prevented. This also provides a theft suppressing effect for example.

If the product equipment has a controller for controlling an operation of the product equipment and this controller writes to the second storage means information about the date on which the product equipment has started operating for the first time after shipment from factory when the secondary history information does not come from the second storage means of the history information recording apparatus, recording the operation start date can substantially provide a certain free-of-charge service coverage even for the illegal sale of the product equipment.

In carrying out the invention and according to a third aspect thereof, there is provided a history information recording apparatus comprising: a first storage means for storing primary history information; a second storage means for storing secondary history information; an encrypting means for encrypting at least one part of the primary history information and/or the secondary history information inputted from outside; an input module in which the primary history information and/or the second history information is inputted to be stored in the first storage means and/or the second storage means respectively; a read module for reading the primary history information from the first storage means and the secondary history information from the second storage means; and a decrypting means for decrypting the encrypted information outputted from the read module.

According to the above-mentioned constitution, at least one part of the primary history information and/or the secondary history information inputted from outside is encrypted by the encrypting means. Consequently, unless decrypted by the decrypting means, the encrypted information cannot be read.

In carrying out the invention and according to a fourth aspect thereof, there is provided a history information recording apparatus comprising: a first storage means for storing primary history information; a second storage means for storing secondary history information; a password imparting means for imparting a password to at least one part of the primary history information and/or the secondary history information inputted outside; an input module in which the primary history information and/or the second history information is inputted to be stored in the first storage means and/or the second storage means respectively; a read module for reading the primary history information from the first storage means and the secondary history information from the second storage means; a password matching means for performing a password matching operation on the password imparted to the history information outputted from the read module; and a password input means for inputting a password into the password matching means.

According to the above-mentioned constitution, a password is imparted to at least one part of the primary history information and/or the secondary history information inputted from outside. Consequently, reading the history information imparted with the password requires inputting a matching password into the input module. The inputted password is matched against the password imparted to at least one part of the primary history information and/or the secondary history information. The history information can be read only when these passwords match each other.

In carrying out the invention and according to a fifth aspect thereof, there is provided a history information recording apparatus comprising: a first storage means for storing primary history information; a second storage means for storing secondary history information; a password imparting means for imparting a password to at least one part of the primary history information and/or the secondary history information inputted outside; an encrypting means for encrypting at least one part of the primary history information and/or the secondary history information; an input module in which the primary history information and/or the second history information is inputted to be stored in the first storage means and/or the second storage means respectively; a read module for reading the primary history information from the first storage means and the secondary history information from the second storage means; a password matching means for performing a password matching operation on the password imparted to the history information outputted from the read module; a password input means for inputting a password into the password matching means; and a decrypting means for decrypting the encrypted history information outputted from the read module.

According to the above-mentioned constitution, a password is imparted to at least one part of the primary history information and/or the secondary history information and this part is also encrypted. Consequently, reading the password-imparted and encrypted history information requires to input a matching password by the input module and decrypts the encrypted part by the decrypting means.

BRIEF DESCRIPTION OF THE DRAWINGS

These and other objects of the invention will be seen by reference to the description, taken in connection with the accompanying drawing, in which.

DETAILED DESCRIPTION OF PREFERRED EMBODIMENTS

This invention will be described in further detail by way of example with reference to the accompanying drawings FIGS. 1 through 9.

It should be noted that, while the preferred embodiments of the present invention have been described using specific terms, such description is for illustrative purposes only, and it is to be understood that changes and variations may be made without departing from the spirit or scope of the appended claims.

Figure 1:
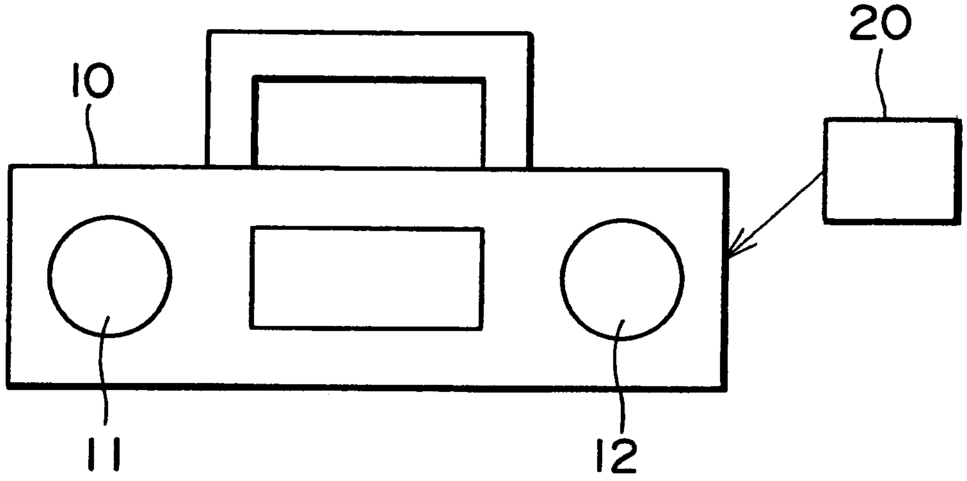
FIG. 1 is a schematic diagram illustrating a product (radio cassette tape recorder for example) having a history information recording apparatus practiced as a first preferred embodiment of the invention.

FIG. 1 illustrates a radio cassette tape recorder for example as product equipment having a first preferred embodiment of a history information recording apparatus associated with the present invention.

In FIG. 1, the radio cassette tape recorder 10 has a known constitution adapted to receive normal AM/FM broadcast or record/reproduce a compact cassette tape, sounding a reproduced sound from speakers 11 and 12.

Further, the radio cassette tape recorder 10 is integrally provided with a history information recording apparatus 20. It should be noted that the history information recording apparatus 20 may be either incorporated in the radio cassette tape 10 or attached later on an outside surface of the main frame of the product.

Figure 2:
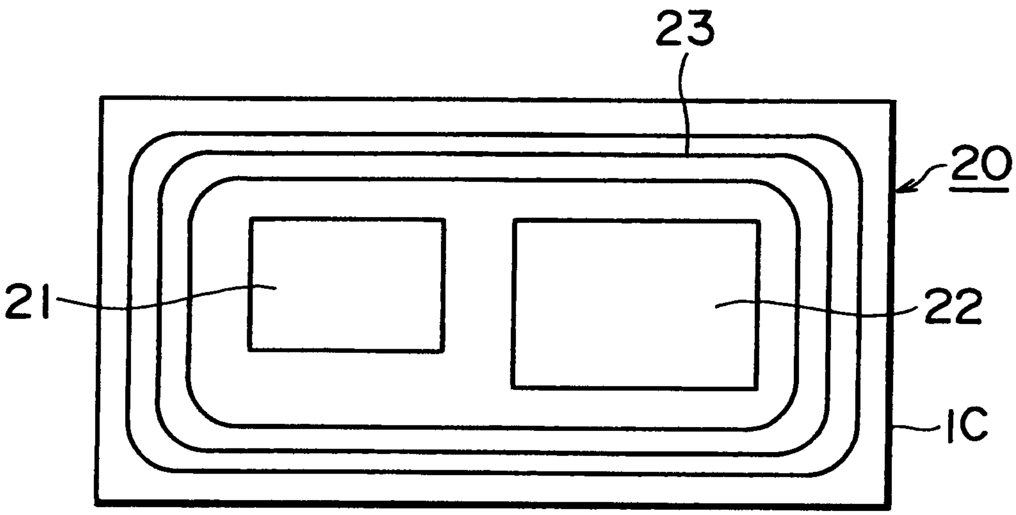
FIG. 2 is an expanded top view illustrating the history information recording apparatus of FIG. 1.

The history information recording apparatus 20 is constituted as shown in FIG. 2 for example. Referring to FIG. 2, the history information recording apparatus 20 has a first storage means 21, a second storage means 22, and a coil 23 that provides an input section to these storage means 21 and 22.

The first storage means 21 is a ROM such as a mask ROM for example that stores product-associated history information including product name, model number, and date of production as primary history information. It should be noted that the first storage means 21 may be constituted integrally with the second storage means as a write-enabled storage means like the second storage means 22 to be described later. The above-mentioned product-associated history information includes product name, serial number, body color, place of manufacture, factory of manufacture, production line number, date of production, assembler name, examiner name, date of shipment, and so on to be specific.

The second storage means 22 is a write-enabled storage device such as a flash memory or an EEPROM for example adapted to store sale-associated history information or service-associated history information as secondary history information. In the case shown, the first and second storage means 21 and 22 are formed as an IC of one unit. It will be apparent to those skilled in the art that these storage means may be separately mounted on the substrate. The sale-associated history information includes date of sale, store name, name of store personnel, sales price, and so on to be specific. The service-associated history information includes date of service, contents of service, name of service personnel, an so on to be specific. It should be noted that the secondary history information may include information about the distribution channels between shipment and sale, namely the arrival and shipment dates at each wholesaler and the name thereof.

Figure 3:
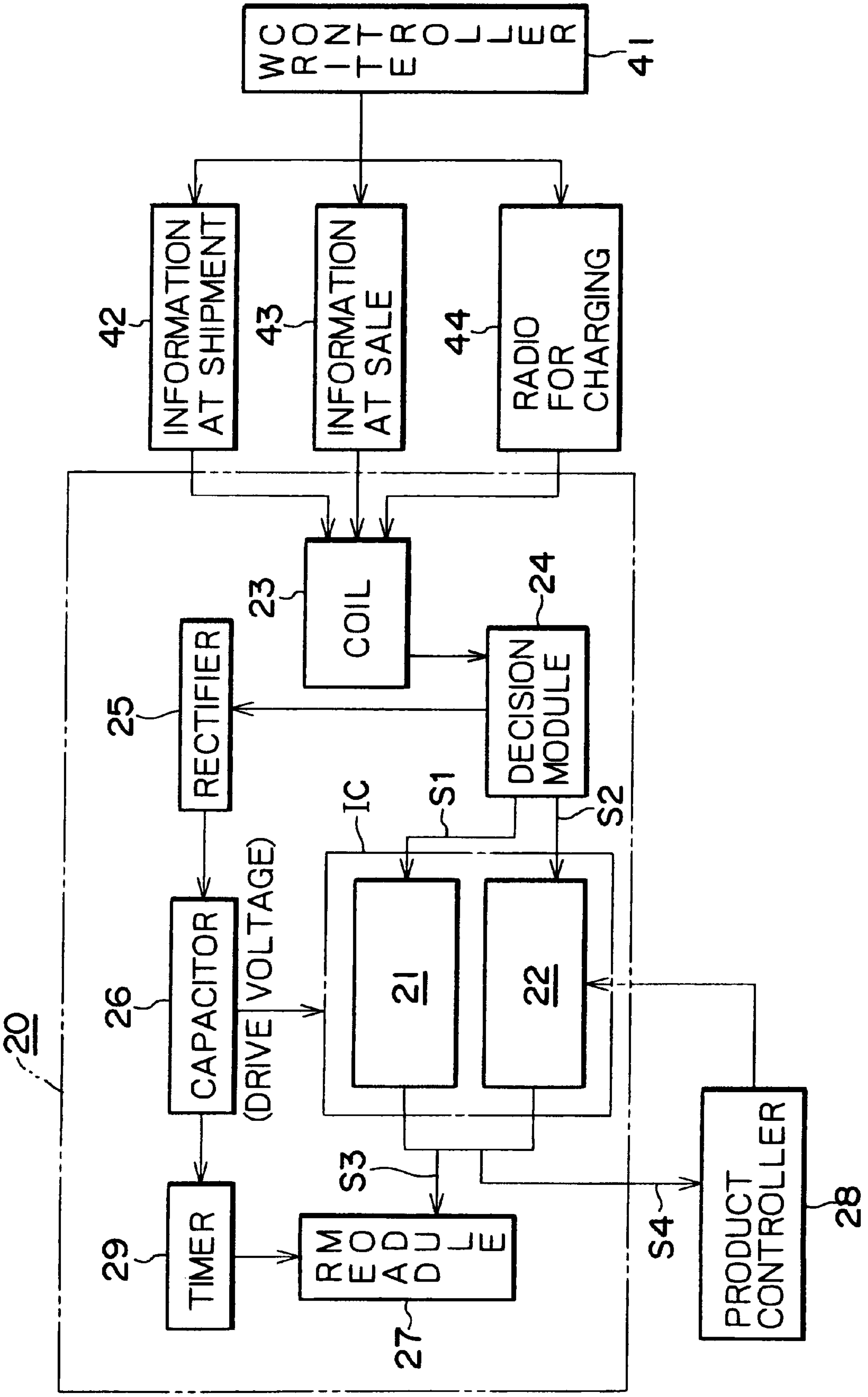
FIG. 3 is a block diagram illustrating an electrical constitution of the history information recording apparatus of FIG. 2.
Figure 4:
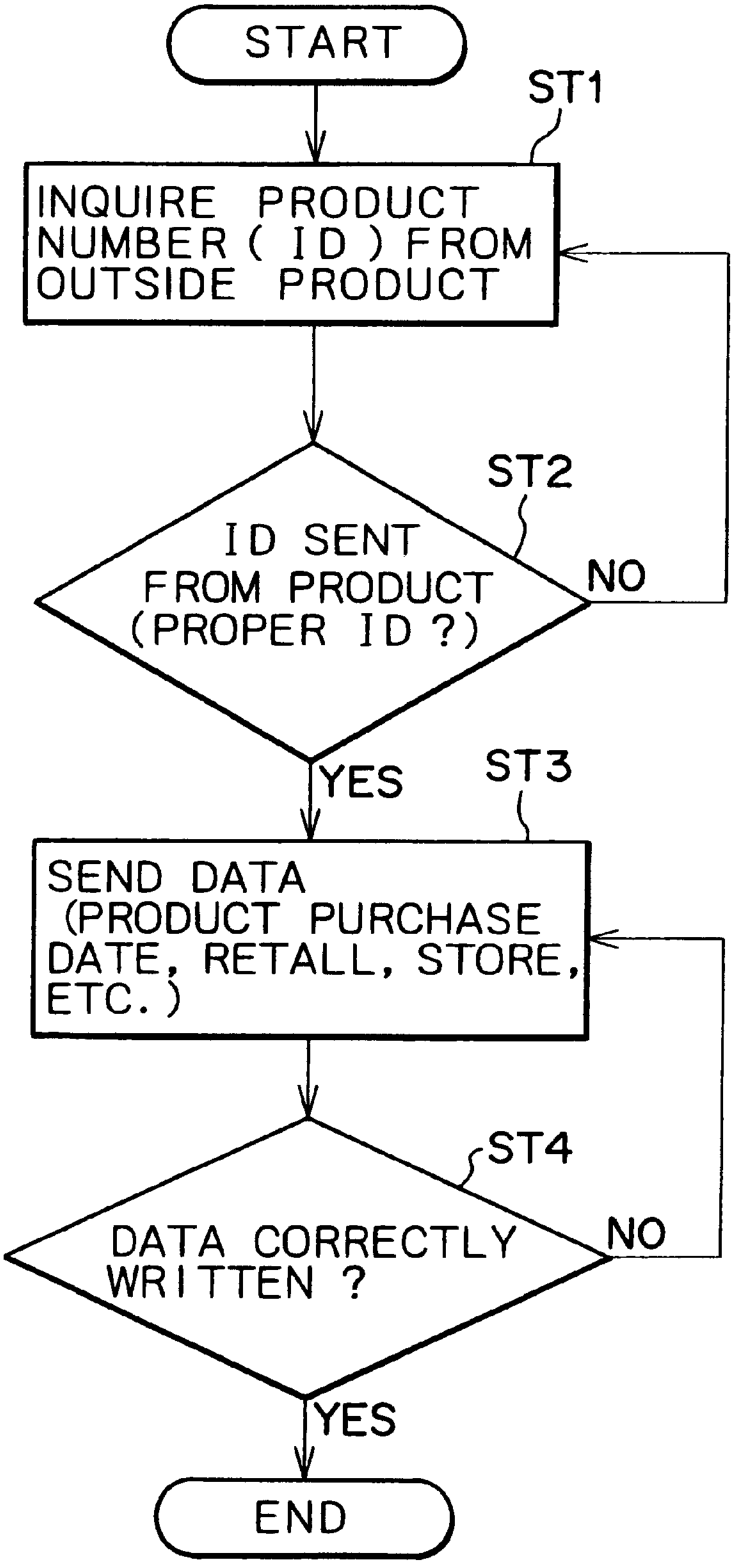
FIG. 4 is a flowchart indicative of an information recording operation to be performed in the history information recording apparatus of FIG. 2.

FIG. 3 illustrates an electrical constitution of the history information recording apparatus 20. As shown in FIG. 3, first and second storage means 21 and 22 of the history information recording apparatus 20 are connected to the coil 23 through a decision module 24. The decision module 24 determines the type (primary history information, secondary history information, etc.) of information inputted from the outside and accordingly inputs the history information to one of the predetermined storage means. Namely, the product-associated history information as manufacturer shipment information and the sale-associated information as store sale information are inputted into the coil 23 as an electromagnetic wave. This electromagnetic wave causes the coil 23 to generate an induced current, which is inputted in the decision module 24. If the history information is found the product-associated history information, which is the primary history information, the decision module 24 outputs this history information to the first storage means 21 if the same is a write-enabled storage means as indicated by S1. If the history information is found the sale-associated information, the decision module 24 outputs this history information to the second storage means 22 as indicated by S2.

A power supply for writing the information to the first and second storage means 21 and 22 constituting the IC may be preferably provided by rectifying by a rectifying means 25 the current caused in the coil 23 from a charging electromagnetic wave received by the coil 23 to charge a capacitor 26, providing a drive current. This eliminates the necessity for a built-in battery. Alternatively, a charging battery may be provided to store such a power, which is used appropriately.

Figure 5:
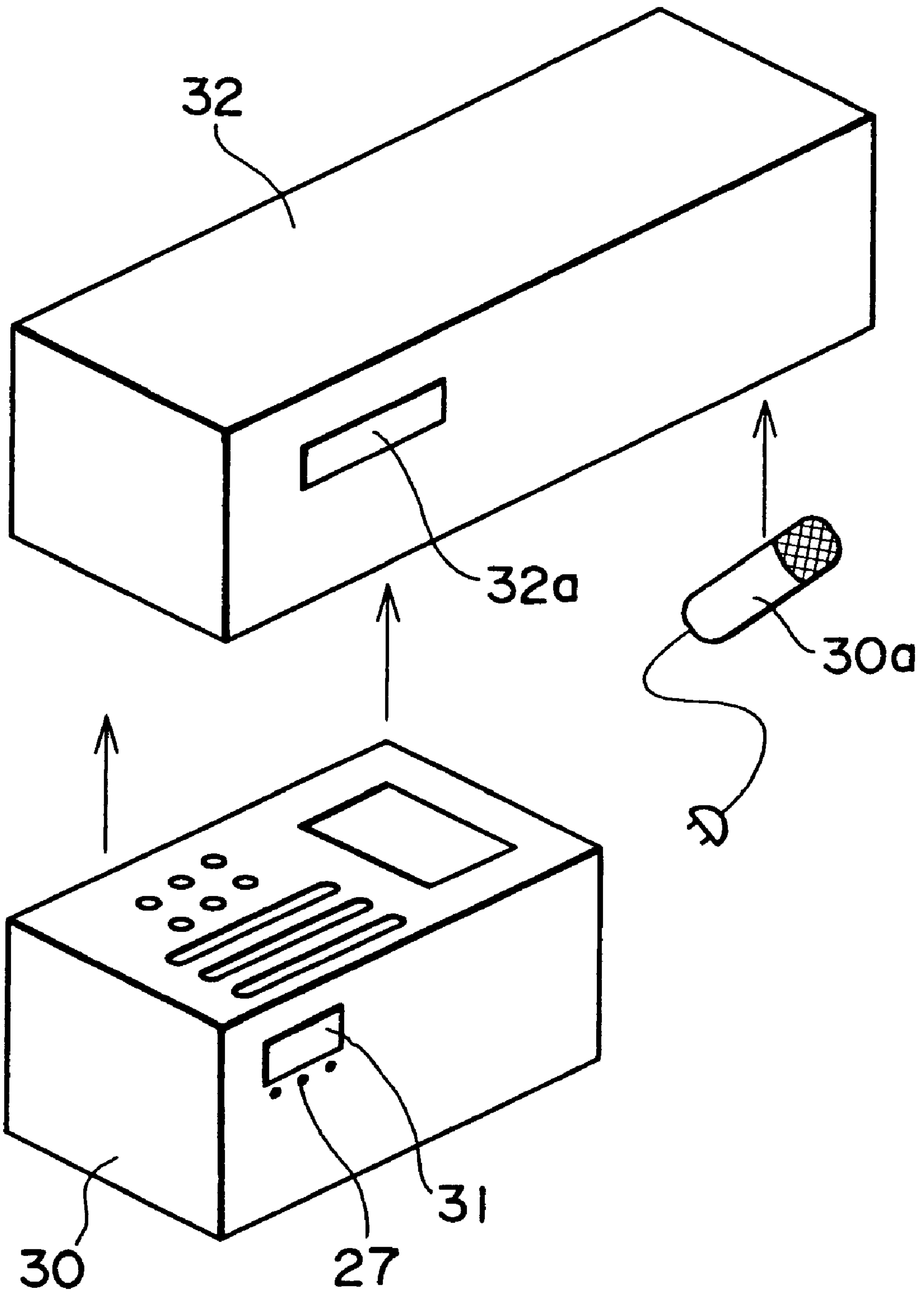
FIG. 5 is schematic diagram illustrating a product having a variation of the history information recording apparatus.

Further, the information stored in the first and second storage means 21 and 22 is sent to a read module 27 as indicated by S3, from which the information is sent outside and, preferably, to a product controller 28 arranged in the radio cassette tape recorder 10 as indicated by S4. The read module 27 includes all means for a reading the information supplied from the first and second storage means 21 and 22 in contact or non-contact manner. For example, the read module 27 may be constituted by a read terminal as shown in FIG. 5 to be described later, in which the information is read from a certain transmission line as an electrical signal. Alternatively, the read module 27 may be constituted by the coil 23 shown in FIG. 3 or a predetermined light-emitting device if an optical signal is used, in which reading of the information from the first and second storage means 21 and 22 is performed in a non-contact manner.

In the first preferred embodiment, the primary history information and the secondary history information are sent from an external write controller 41 through write means 42, 43, and 44 as an electromagnetic wave for example. It will be apparent to those skilled in the art that these pieces of information may be transmitted in a non-contact manner, namely in the form of light, which is also an electromagnetic wave, a voice signal, an image signal, or an electrical signal. If the transmission from the external write controller 41 is performed in the form of optical signal for example, the transmission is performed as shown in FIG. 5. Referring to FIG. 5, a window 32*a* made by a transparent film for example is provided on a package material 32 of product equipment 30 (in this example, a tape recorder having a microphone 30*a*) in correspondence to a light receiving module 31 serving as an input module exposed outside the product equipment 30 in which the history information recording apparatus 20 is arranged.

When an optical signal from the external write controller 41 enters through transmitting modules 42, 43, and 44 each constituted by a light-emitting means into this window 32*a*, the optical signal is received by the light receiving module 31 of the product equipment aligned to the window 32*a*, the product equipment being in a packaged state. This writes the primary and secondary information from the outside to the history information recording apparatus 20 in a non-contact manner. Thus, information recording performed optically rather than by electromagnetic wave provides information recording hardly affected by noise. It should be noted that the constitution shown in FIG. 5 can be used without change for writing information by electromagnetic wave to the history information recording apparatus 20 if the window 32*a* is made to pass electromagnetic wave easily.

If voice is used for the transmission from the external write controller 41, the history information recording apparatus incorporated in the product has a microphone as an input module and a voice recognizing processor. If the transmission from the external controller 41 is performed in the form of an image, for example a bar code, the history information recording apparatus incorporated in the product has a bar code reader as the input module. If the transmission from the external write controller 41 is performed based on an electrical signal, the history information recording apparatus incorporated in the product has a terminal exposed from the product as the input module. If the transmission from the external write controller 41 is performed based on a magnetic-field modulated signal, the history information recording apparatus incorporated in the product has the coil shown in FIGS. 2 and 3 as the input module.

The following describes an example of writing history information. If the primary history information was already recorded at shipment from factory onto the history information recording apparatus of the product equipment and the sale-associated history information is to be recorded on this history information recording apparatus at a store for example, the sale-associated information is written as indicated by the flowchart shown in FIG. 4. Namely, referring to FIG. 4, in step ST1, the external write controller 41 reads product-associated history information, for example the identification number (ID) of the product, from the first storage means 21 through the read module 27.

Next, in step ST2, if this ID is found incorrect or cannot be read, the external write controller 41 tries to read the ID back in step ST1 again. If this ID is found correct, it indicates that the product has been identified. Then, the external write controller 41 transmits the sale-associated information (for example, the date of sale and the name of the store) in step ST3.

When the sale-associated information has been supplied, the decision module 24 determines through the coil 23 that the information is associated with sale and outputs this decision to the second storage means 22, the sale-associated information, which is the secondary history information, being written to the second storage means 22. Lastly, in step ST4, the write controller 41 reads from the read module 27 the sale-associated information, which is the secondary history information written to the second storage means 22. If this sale-associated information is found incorrect, the write controller 41 transmits the sale-associated information in step ST3 again. If the sale-associated information is found correct, the write processing comes to an end.

Further, preferably, the product controller 28 is set such that the radio cassette tape recorder 10, which is the product, will not operate if the sale-associated history information read from the second storage means 22 contains no information about the date of sale especially. This setup prevents an illegal act of not writing the date of sale intentionally, which has been sometimes practiced conventionally. At the same time, if the product is stolen for example, that product, namely the radio cassette tape recorder 10 will not operate because the sale-associated information has not been written, thereby providing a theft preventing effect.

Moreover, the product controller 28 preferably writes to the second storage means 22 the date at which the radio cassette tape recorder 10 operated for the first time after shipment from factory. This arrangement prevents warranty coverage from being extended unduly if the information about the date of sale for example is not stored in the second storage means 22. In this case, a trigger signal is inputted from the capacitor 26 into a time or a clock 29 for example when the sale-associated information has been written to the second storage means 22 to cause the timer or clock 29 to count time, facilitating the writing of the date at which the product operated for the time.

The radio cassette tape recorder 10 having the history information recording apparatus 20 according to the present embodiment is constituted as described above and the radio cassette tape recorder 10 itself is used as an ordinary radio cassette tape recorder. Further, the radio cassette tape recorder 10 is arranged with the history information recording apparatus 20. The product-associated history information as the primary history information and the sale-associated history information as the secondary history information are written to the first storage means 21 and the second storage means 22 respectively. This constitution provides a so-called electronic (or optical or electromagnetic) warranty card.

Therefore, unlike the ordinary paper-based warranty card which is separately furnished with a product, the history information recording apparatus 20 does not present such problems inherent to the ordinary warranty card as loss and becoming smudgy and illegible. This allows the user to have secure free service within a predetermined warranty coverage stipulated by the warranty card. On the other hand, since the sale-associated information is stored in the second storage means 22 as the secondary history information, the manufacturer can securely identify the date of sale, thereby providing correct control of warranty coverage.

In addition, service-associated history information and distribution-associated history information may be written to the second storage means 22 of the history information recording apparatus 20 as secondary history information. This allows the manufacturer to easily grasp the service history of each individual product, facilitating the statistical control over the durability and the mean time between failures of the product.

Since the primary history information and the secondary history information are written to the history information recording apparatus 20 by use of radio in a non-contact manner, the writing of the history information can be easily performed after assembling or packaging of the radio cassette tape recorder 10 as the product. Also, this writing can be performed for each individual product or for plural products at a time.

Figure 6A:
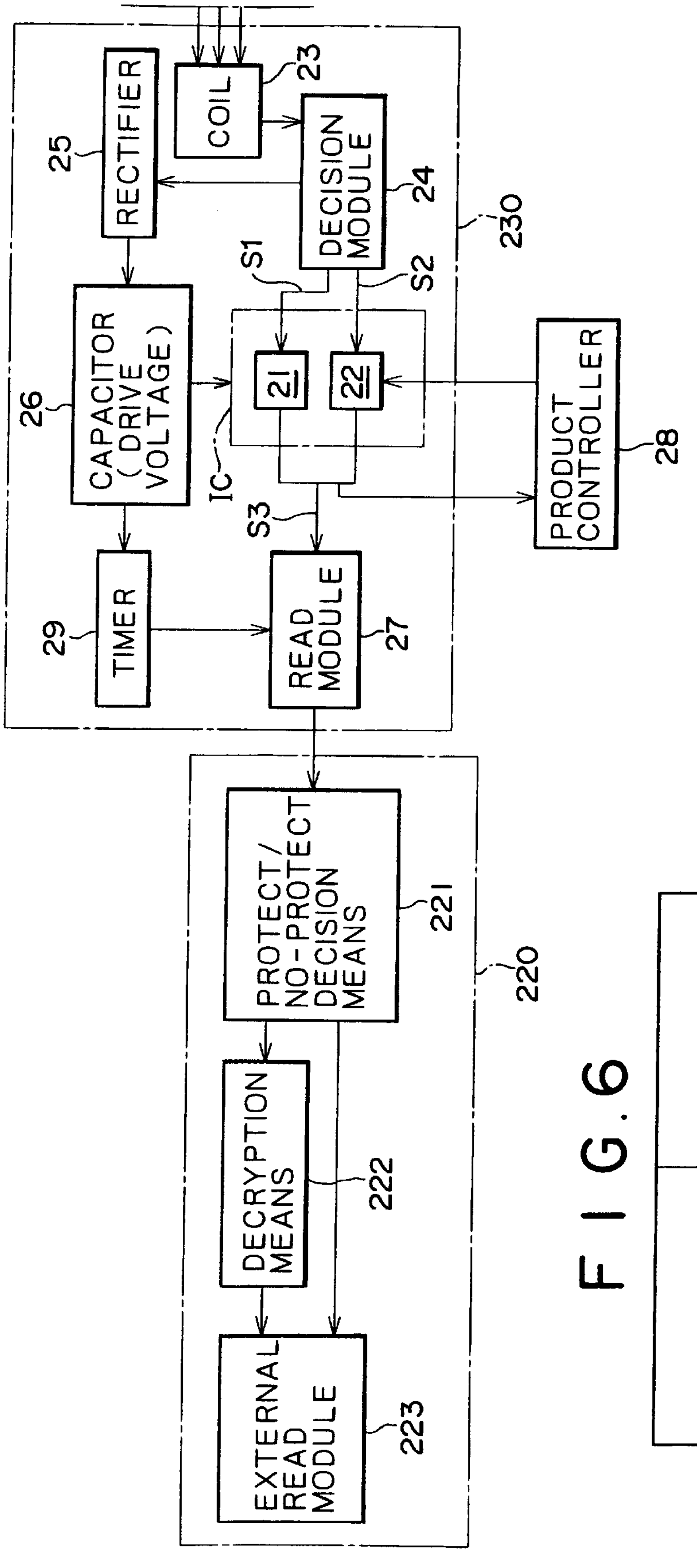
FIG. 6 is a block diagram illustrating an electrical constitution of a history information recording apparatus practiced as a second preferred embodiment of the invention.
Figure 6:
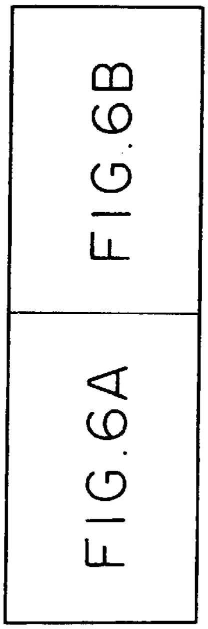
Figure 6B:
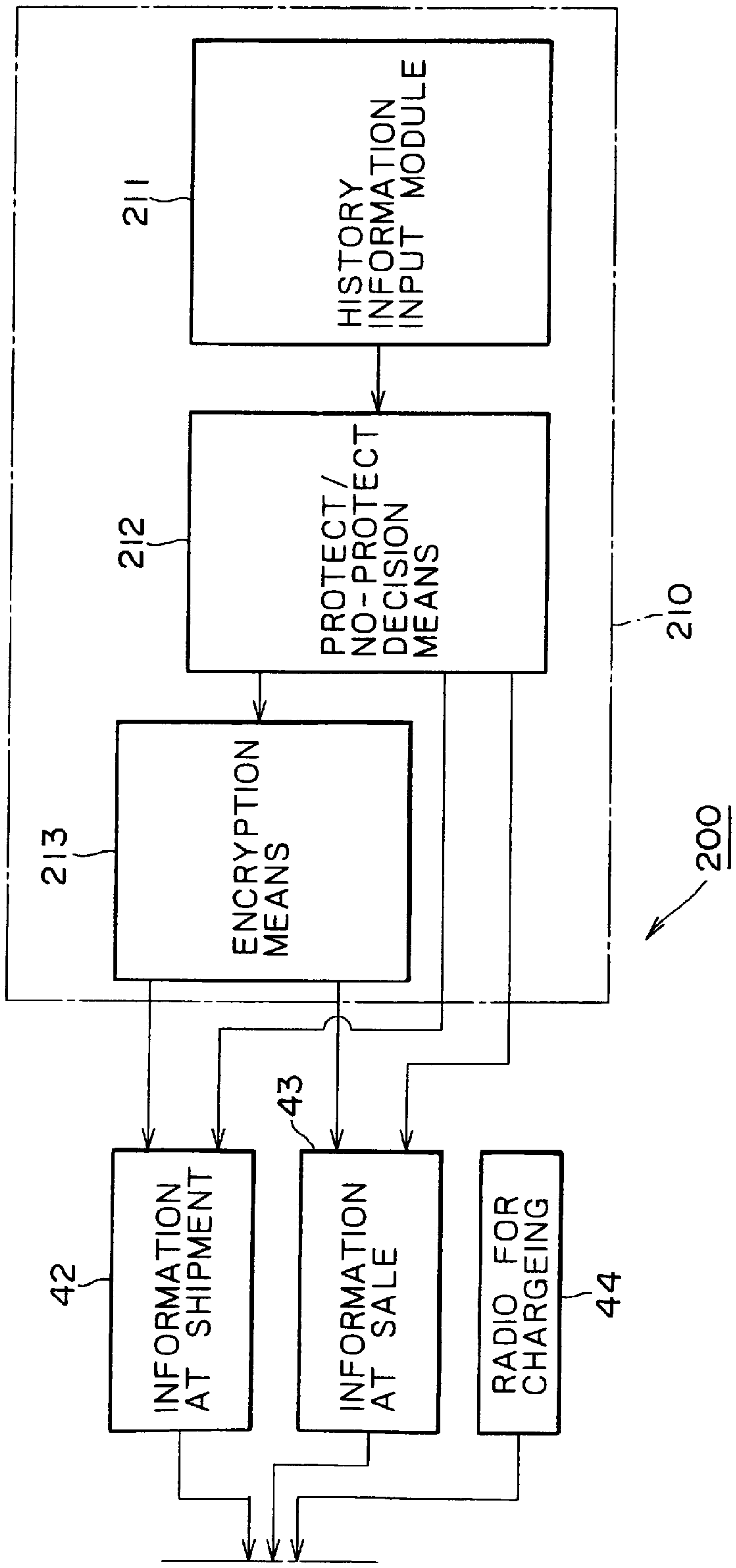

FIG. 6 is a block diagram illustrating an electrical constitution of a history information recording apparatus practiced as a second preferred embodiment of the invention. A main module 230 of a history information recording apparatus 200 has generally the same constitution as that of the above-mentioned first preferred embodiment. Namely, the main module 230 is mounted on product equipment for example. However, unlike the first preferred embodiment, the history information recording apparatus 200 is provided with an external operating module for information inputting 210 and an external operating module for information reading 220 that are not attached to the product equipment. The external operating module for information inputting 210 has a history information input module 211 in which history information is inputted from outside and a protection/no-protection decision means 212 for determining whether the history information inputted in the history information input module 211 is protected or not protected.

Of the history information inputted in the history information input module 211, the protect/no-protect decision means 212 processes confidential information such as service history for example as protected information. To be more specific, such confidential information is inputted with a flag into the history information input module 211. The information attached with this flag is determined as protected information. The external operating module for information inputting 210 is also provided with a encrypting means 213 for encrypting the history information determined by the protect/no-protect decision means 212 as protected information. The encrypting means 213 encrypts history information by use of a particular encryption method, for example character interchanging or transposing. The resultant encrypted history information is outputted from the external operating module for information inputting 210.

On the other hand, the history information determined by the protect/no-protect decision means 212 as no-protected information is not encrypted and outputted as it is from the external operating module for information inputting 210. Thus, the history information outputted from the external operating module for information inputting 210 is determined for its type through write means 42, 43, and 44 and a coil 23 like the above-mentioned first preferred embodiment to be inputted accordingly into a first storage means 21 or the second storage means 22. Unlike the main module 230, the external operating module for information inputting 210 is not attached to the product equipment, so that the external operating module for information inputting 210 remains at the side of the operator. Therefore, if a third party attempts to analyze the circuit of the main module 230 attached to the product equipment, the encryption method used cannot be known.

It should be noted that history information may be inputted from the external operating module for information inputting 210 into the main module 230 in either a contact manner or a non-contact manner. For example, this inputting may be performed based on a radio signal, an optical signal, a voice signal, an image signal, or a electrical signal. The history information thus inputted in the first storage means 21 or the second storage means 22 is outputted by a read module 27 as with the first preferred embodiment. It should be noted that, unlike the first preferred embodiment, the second preferred embodiment has the external operating module for information reading 220 that is not attached to the product equipment. The external operating module for information reading 220 receives the history information outputted from the read module 27 of the main module 230 attached to the product equipment.

Because the history information received by the external operating module for information reading 220 contains encrypted history information, the external operating module for information reading 220 has a protect/no-protect decision means 221 for determining whether the history information outputted from the read module 27 of the main module 230 contains protected information or not. The protect/no-protect decision means 221 makes discrimination between the information encrypted by the encrypting means 213 of the external operating module for information inputting 210 and the history information not encrypted. The encrypted history information is decrypted by a decrypting means 222 arranged in the external operating module for information reading 220. The decrypting means 222 has a key used by the encrypting means 213. The decrypting means 222 uses this key for decryption.

Thus, the encrypted history information is decrypted to be inputted in an external read module 223 arranged in the external operating module for information reading 220. On the other hand, the history information not encrypted is determined for its type by the protect/no-protect decision means 221 to be inputted as it is to the external read module 223. The history information inputted in the external read module 223 can be displayed on a display device for example. At this moment, because the external operating module for information reading 220 is not attached to the product equipment, outputting the information stored in the first and second storage means 21 and 22 of the main module 230 attached to the product equipment requires the user to have this external operating module for information reading 220. Also, decrypting the encrypted information in the information stored in the first and second storage means 21 and 22 of the main module 230 requires the user to have the external operating module for information reading 220 incorporating the decrypting means 222 having the same key as that used for encryption.

The history information may be inputted from the main module 230 into the external operating module for information reading 220 in either a contact manner or a non-contact manner. For example, this inputting may be performed based on a radio signal, an optical signal, a voice signal, an image signal, or a electrical signal. Thus, in the second preferred embodiment, the external operating module for information inputting 210 for inputting history information and the external operating module for information reading 220 for outputting history information are not attached to the product equipment and the encrypting means 213 and the decrypting means 222 are arranged in the external operating module for information inputting 210 and the external operating module for information reading 220 respectively. Consequently, no third party can access the history information unless the third party has the external operating module for information reading 220. If the third party attempts to analyze the IC of the main module 230 attached to product equipment, the third party cannot know the encrypting method used because the protected information is encrypted and the encrypting means 213 is not attached to the main module 230 attached to the product equipment. Thus, the above-mentioned setup effectively prevents any third party from reading the history information.

Figure 7B:
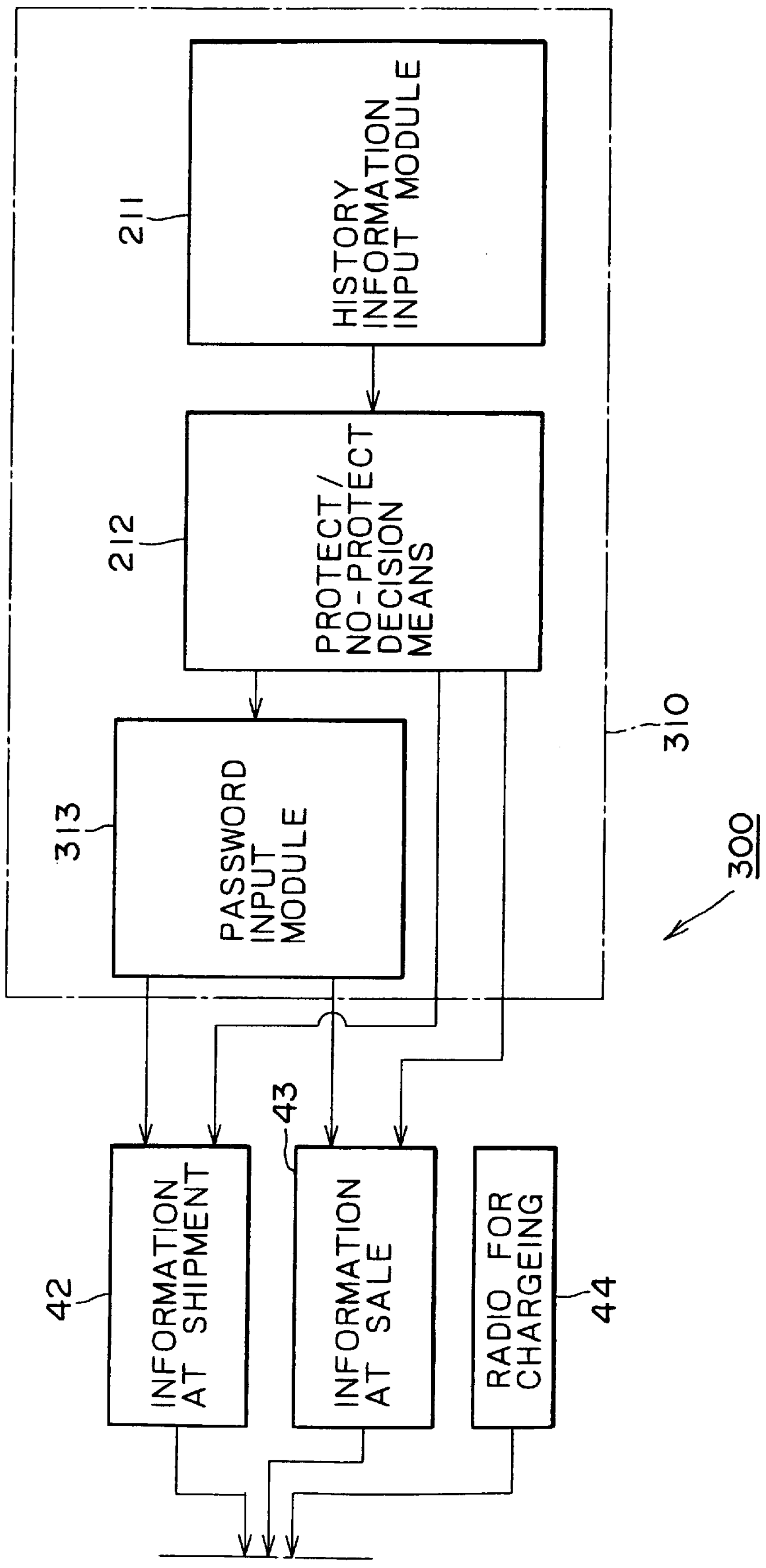
FIG. 7 is a block diagram illustrating an electrical constitution of a history information recording apparatus practiced as a third preferred embodiment of the invention.

FIG. 7 is a block diagram illustrating an electrical constitution of a history information recording apparatus practiced as a third preferred embodiment of the invention. A main module 230 of a history information recording apparatus 300 has generally the same constitution as that of the above-mentioned second preferred embodiment. However, unlike the second preferred embodiment, an external operating module for information inputting 310 of the history information recording apparatus 300 has a password input module 313 instead of the encrypting means 213. Unlike the second preferred embodiment, an external operating module for information reading 320 of the history information recording apparatus 300 has a password input module 324 and a password matching module 322 instead of the decrypting means 222. The other components are generally the same as those of the second preferred embodiment and therefore mainly the differences will be described with reference to FIGS. 7 and 8.

Referring to FIG. 7, protected information in history information is inputted in a password imparting means 313 through a history information input module 211 and a protect/no-protect decision means 212 of the external operating module for information inputting 310. The history information imparted with a password inputted from the external operating module for information inputting 310 into a first storage means 21 or a second storage means 22 of the main module 230 attached to the product equipment is outputted from a read module 27 of the main module 230 to an external operating module for information reading 320 not attached to the product equipment. The protected information in the history information inputted in the external operating module for information reading 320 is inputted in the password matching means 322 through a protect/no-protect means 221. A same password as that imparted by the password imparting means 313 in the external operating module for information inputting 210 is inputted from the password input module 324 into the password matching means 322.

Figure 8:
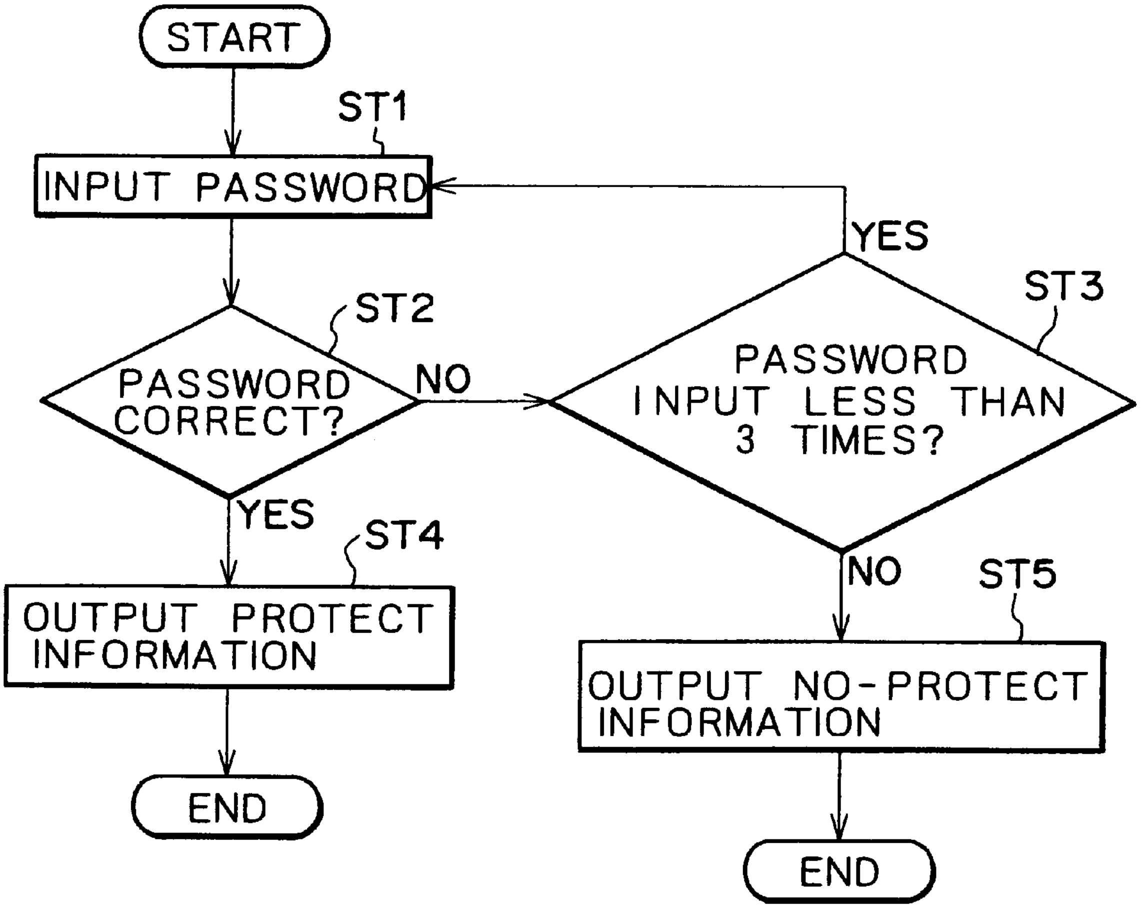
FIG. 8 is a flowchart indicative of a password matching operation in the history information recording apparatus of FIG. 7.

In the password matching means 322, the password imparted to the inputted history information is matched against the password inputted from the password input module 324. This matching operation is shown in a flowchart of FIG. 8. Referring to FIG. 8, first, in step ST1, the password is inputted in the password input module 324. Next, in step ST2, the inputted password is matched against the password imparted to the history information. If the two passwords are found matching, the protected information is outputted to the external read module 223 in step ST4.

On the other hand, if a mismatch is found in step ST2, then, in step ST3, the number of times the password was inputted is determined. If the number is found less than 3, then, back in step ST1, the password is inputted again. If the number is found 3 in step ST3, it is determined that the password inputting operation has been done by an unauthorized user and only unprotected information is outputted. Thus, in the third preferred embodiment, unless the user inputs a correct password into the password input module 324 of the external operating module for information reading 320, the protected information in history information cannot be read. Therefore, if the external operating module for information reading 320 is passed to any third party inadvertently, the protected information is kept inaccessible by the third party. This setup effectively prevents unauthorized access to the protected history information.

Figure 9A:
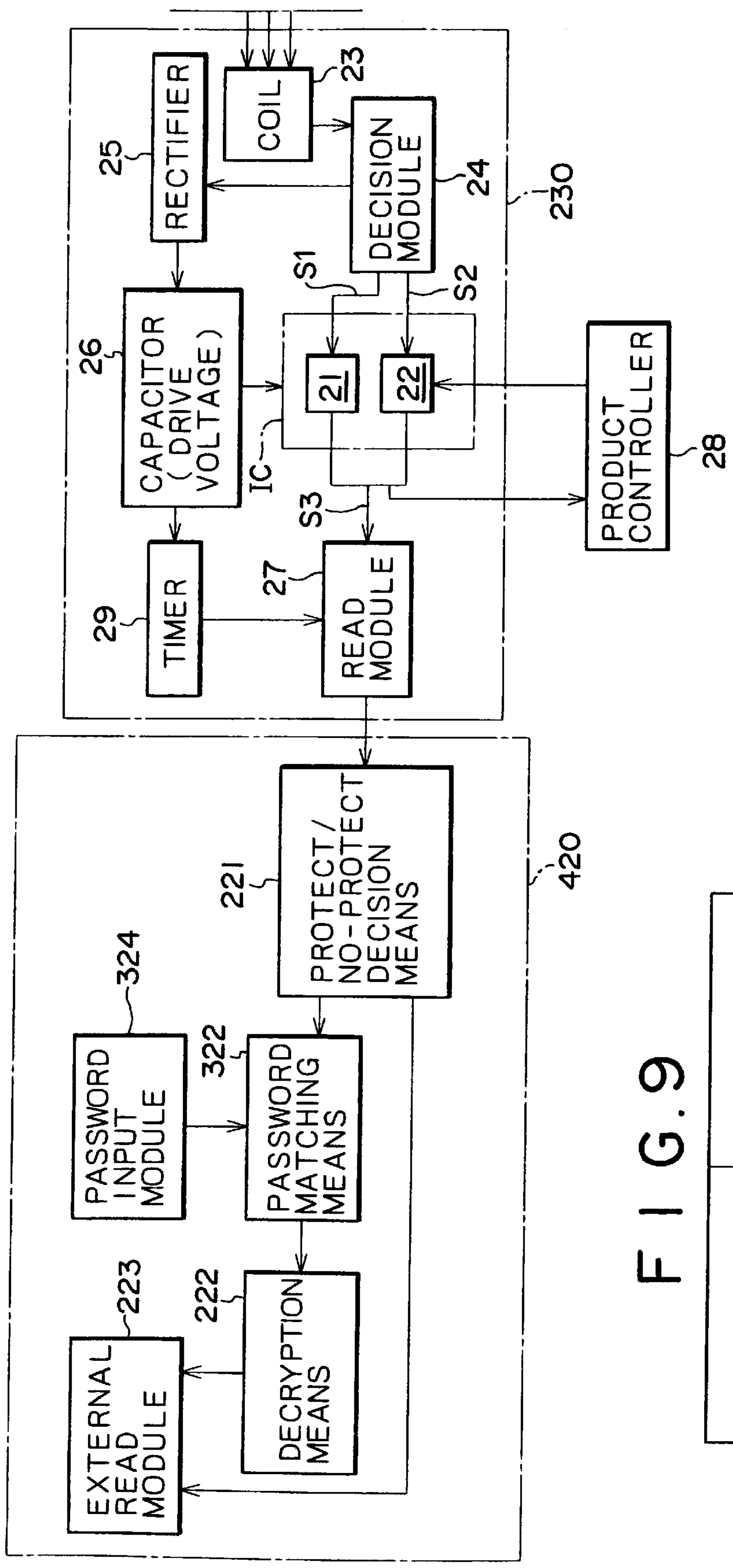
FIG. 9 is a block diagram illustrating an electrical constitution of a history information recording apparatus practiced as a fourth preferred embodiment of the invention.
Figure 9:
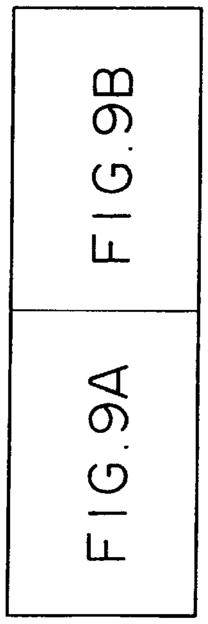
Figure 9B:
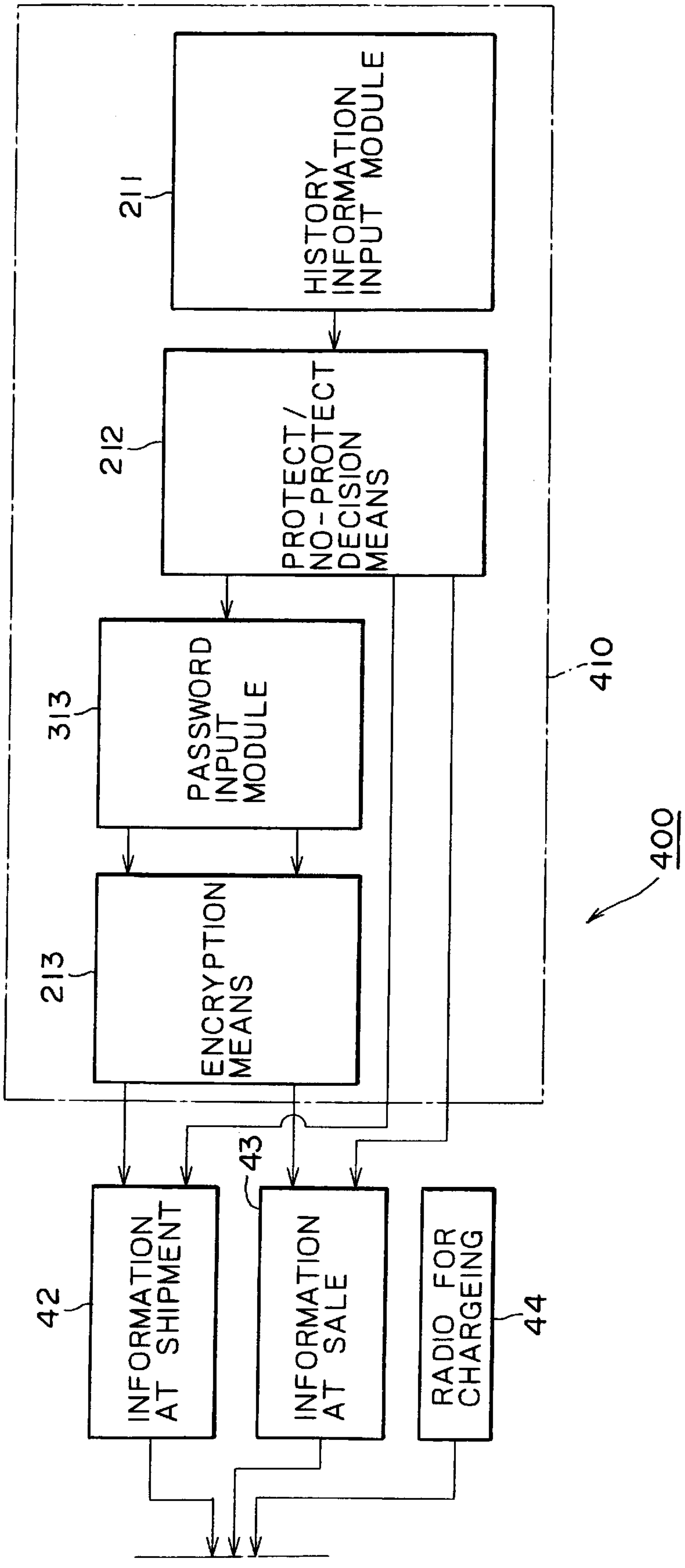

FIG. 9 is a block diagram illustrating an electrical constitution of a history information recording apparatus practiced as a fourth preferred embodiment of the invention. The overall constitution of the fourth preferred embodiment is generally the same as those of the above-mentioned second and third preferred embodiments and therefore mainly the differences will be described. Unlike the second and third preferred embodiments, an external operating module for information inputting 410 of a history information recording apparatus 400 shown in FIG. 9 has a password imparting means 313 and an encrypting means 213. Therefore, the protected information in history information is imparted with a password and then encrypted. The password impartation is performed in generally the same manner as that of the third preferred embodiment. The encryption is performed in generally the same manner as that of the second preferred embodiment. The protected information imparted with the password and encrypted is outputted from a read module 27 of a main module 230 attached to the product equipment to an external operating module for information reading 420 not attached to the product equipment.

Unlike the second and third preferred embodiments, the external operating module for information reading 420 of the fourth preferred embodiment has a password input module 324, a password matching means 221, and a decrypting means 222. Therefore, if a password inputted in the password input module 324 of the external operating module for information reading 420 is found correct, then the encrypted information is decrypted by the decrypting means 222 to be read by an external read module 223. The password input module 324 and the password matching means 221 are generally the same as those of the third preferred embodiment. The decrypting means 222 is generally the same as that of the second preferred embodiment. Thus, in the fourth preferred embodiment, encryption and password input are combined to effectively prevent any third party from accessing the history information, especially the protected history information.

What is claimed is:

1. A history information recording apparatus comprising:

a first storage means for storing primary history information;

a second storage means for storing secondary history information;

an input module in which said primary history information and/or said second history information is inputted to be stored in said first storage means and/or said second storage means respectively; and a read module for reading said primary history information from said first storage means and said secondary history information from said second storage means;

wherein said first storage means, said second storage means, said input module, and said read module are arranged on product equipment.

2. The history information recording apparatus as claimed in claim 1, wherein said primary history information and/or said secondary history information is inputted from outside into said input module in a non-contact manner.

3. The history information recording apparatus as claimed in claim 2, wherein said input module is a coil and said primary history information and/or secondary history information is inputted in said input module by use of an electromagnetic wave signal.

4. The history information recording apparatus as claimed in claim 1, wherein said primary history information to be stored in said first storage means is associated with said product equipment.

5. The history information recording apparatus as claimed in claim 1, wherein said secondary history information to be stored in said second storage means is associated with sale of said product equipment.

6. The history information recording apparatus as claimed in claim 1, wherein said secondary history information to be stored in said second storage means is associated with service of said product equipment.

7. The history information recording apparatus as claimed in claim 1, wherein said primary history information and/or said secondary history information is inputted in said input module by use of an electrical signal.

8. The history information recording apparatus as claimed in claim 1, wherein said primary history information and/or said secondary history information is inputted from outside into said input module by use of a voice signal.

9. The history information recording apparatus as claimed in claim 1, wherein said primary history information and/or said secondary history information is inputted from outside into said input module by use of an image signal.

10. The history information recording apparatus as claimed in claim 1, wherein said primary history information and/or said secondary history information is read in a non-contact manner.

11. Product equipment having a history information recording apparatus comprising:

a first storage means for storing primary history information;

a second storage means for storing secondary history information;

an input module in which said primary history information and/or said second history information is inputted to be stored in said first storage means and/or said second storage means respectively; and a read module for reading said primary history information from said first storage means and said secondary history information from said second storage means.

12. The product equipment as claimed in claim 11, wherein said product equipment has a controller for controlling an operation of said product equipment, said controller preventing said product equipment from operating if said secondary history information does not come from said second storage means of said history information recording apparatus.

13. The product equipment as claimed in claim 11, wherein said product equipment has a controller for controlling an operation of said product equipment, said controller writing to said second storage means information about a date on which said product equipment has started operating for the first time after shipment from factory.

14. A history information recording apparatus comprising:

a first storage means for storing primary history information;

a second storage means for storing secondary history information;

an encrypting means for encrypting at least one part of said primary history information and/or said secondary history information inputted from outside;

an input module in which said primary history information and/or said second history information is inputted to be stored in said first storage means and/or said second storage means respectively;

a read module for reading said primary history information from said first storage means and said secondary history information from said second storage means; and a decrypting means for decrypting the encrypted information outputted from said read module.

15. The history information recording apparatus of claim 14, wherein a main module incorporating said first storage means, said second storage means, said input module, and said read module is separated from an external operating module incorporating said encrypting means and said decrypting means.

16. A history information recording apparatus comprising:

a first storage means for storing primary history information;

a second storage means for storing secondary history information;

a password imparting means for imparting a password to at least one part of said primary history information and/or said secondary history information inputted outside;

an input module in which said primary history information and/or said second history information is inputted to be stored in said first storage means and/or said second storage means respectively;

a read module for reading said primary history information from said first storage means and said secondary history information from said second storage means;

a password matching means for performing a password matching operation on said password imparted to the history information outputted from said read module; and a password input means for inputting a password into said password matching means.

17. The history information recording apparatus as claimed in claim 16, wherein a main module incorporating said first storage means, said second storage means, said input module, and said read module is separated from an external operating module incorporating said password imparting means, said password matching means, and said password input means.

18. A history information recording apparatus comprising:

a first storage means for storing primary history information;

a second storage means for storing secondary history information;

a password imparting means for imparting a password to at least one part of said primary history information and/or said secondary history information inputted outside;

an encrypting means for encrypting at least one part of said primary history information and/or said secondary history information;

an input module in which said primary history information and/or said second history information is inputted to be stored in said first storage means and/or said second storage means respectively;

a read module for reading said primary history information from said first storage means and said secondary history information from said second storage means;

a password matching means for performing a password matching operation on said password imparted to the history information outputted from said read module;

a password input means for inputting a password into said password matching means; and a decrypting means for decrypting the encrypted history information outputted from said read module.

19. The history information recording apparatus as claimed in claim 18, wherein a main module incorporating said first storage means, said second storage means, said input module, and said read module is separated from an external operating module incorporating said password imparting means, said encrypting means, said password matching means, said password input means, and said password decrypting means.

20. Product equipment having a history information recording apparatus comprising:

a first storage means for storing primary history information;

a second storage means for storing secondary history information;

an encrypting means for encrypting at least one part of said primary history information and/or said secondary history information;

an input module in which said primary history information and/or said second history information is inputted to be stored in said first storage means and/or said second storage means respectively;

a read module for reading said primary history information from said first storage means and said secondary history information from said second storage means; and a decrypting means for decrypting the encrypted history information outputted from said read module.

21. The product equipment as claimed in claim 20, wherein said product equipment has a controller for controlling an operation of said product equipment, said controller preventing said product equipment from operating if said secondary history information does not come from said second storage means of said history information recording apparatus.

22. Product equipment having a history information recording apparatus comprising:

a first storage means for storing primary history information;

a second storage means for storing secondary history information;

a password imparting means for imparting a password to at least one part of said primary history information and/or said secondary history information inputted outside;

an input module in which said primary history information and/or said second history information is inputted to be stored in said first storage means and/or said second storage means respectively;

a read module for reading said primary history information from said first storage means and said secondary history information from said second storage means;

a password matching means for performing a password matching operation on said password imparted to the history information outputted from said read module; and a password input means for inputting a password into said password matching means.

23. The product equipment as claimed in claim 22, wherein said product equipment has a controller for controlling an operation of said product equipment, said controller preventing said product equipment from operating if said secondary history information does not come from said second storage means of said history information recording apparatus.

24. Product equipment having a history information recording apparatus comprising:

a first storage means for storing primary history information;

a second storage means for storing secondary history information;

a password imparting means for imparting a password to at least one part of said primary history information and/or said secondary history information inputted outside;

an encrypting means for encrypting at least one part of said primary history information and/or said secondary history information;

an input module in which said primary history information and/or said second history information is inputted to be stored in said first storage means and/or said second storage means respectively;

a read module for reading said primary history information from said first storage means and said secondary history information from said second storage means;

a password matching means for performing a password matching operation on said password imparted to the history information outputted from said read module;

a password input means for inputting a password into said password matching means; and a decrypting means for decrypting the encrypted history information outputted from said read module.

25. The product equipment as claimed in claim 24, wherein said product equipment has a controller for controlling an operation of said product equipment, said controller preventing said product equipment from operating if said secondary history information does not come from said second storage means of said history information recording apparatus.

* * * * *